Nov. 21, 1961 W. GRUBER 3,009,846
REPAIR PATCH OR JOINING MEMBER FOR RUBBER AND RUBBERIZED
ARTICLES AND A METHOD OF PRODUCING THE SAME
Filed Aug. 3, 1956 2 Sheets-Sheet 1
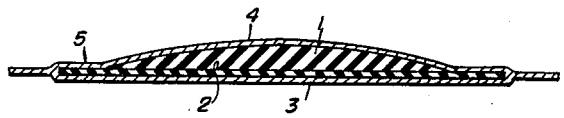
FIG.1
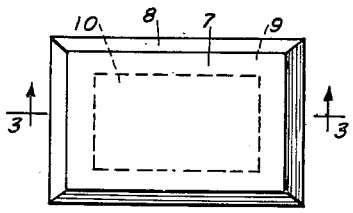
FIG.2
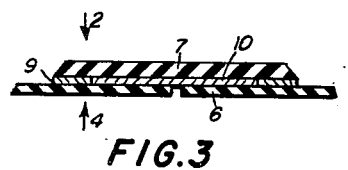
FIG.3
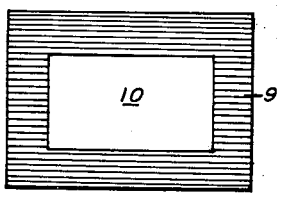
FIG.4
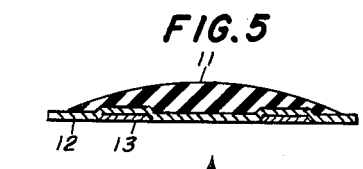
FIG.5
FIG.6
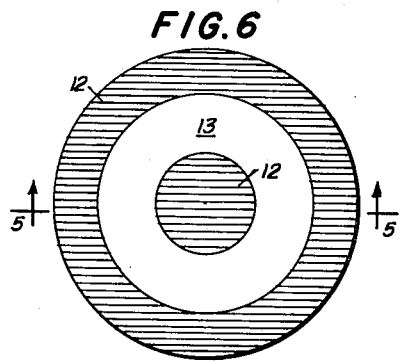
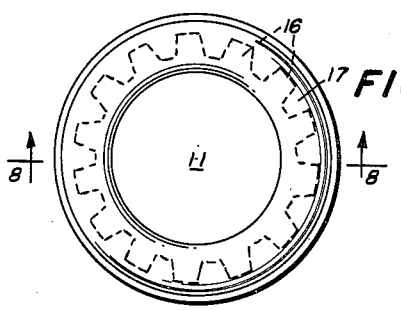
FIG.7
FIG.8
FIG.9
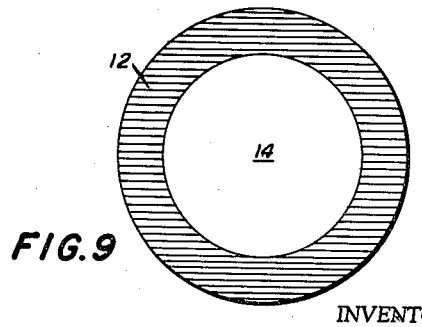
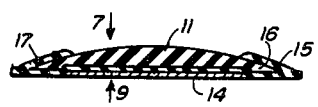
INVENTOR
WILHELM GRUBER
ATTORNEYS

:::::::::::::::::::::::::::::::::::::::::::::::::::::::::::::::::::::::::

United States Patent Office 3,009,846
Patented Nov. 21, 1961

1

3,009,846
REPAIR PATCH OR JOINING MEMBER FOR RUBBER AND RUBBERIZED ARTICLES AND A METHOD OF PRODUCING THE SAME
Wilhelm Gruber, Munich, Germany, assignor to Stahlgruber, Otto Gruber & Co., Munich, Germany
Filed Aug. 3, 1956, Ser. No. 602,028
Claims priority, application Germany Aug. 3, 1955
21 Claims.  (Cl. 154—53.5)

The present invention relates broadly to the art of repairing rubber or rubberized articles.

More particularly, this invention relates to a repair patch or joining member for repairing or connecting rubber parts or rubberized parts or articles and to a method of producing the same.

The repair of damaged rubber or rubberized parts and/or the connection together of two or more rubber or rubberized parts or articles, for example, bicycle or motor vehicle inner tubes or tires, rubber shoes and boots, rubber or rubberized awnings, conveyor belts, hose, cables or the like, is effected either by conventional hot vulcanized methods in which unvulcanized rubber mixtures are utilized, or by adhesively securing on or vulcanizing on repair or joining members, hereinafter called patches, either without the application of external heat or with the application of only a small heat quantity.

For this purpose there are presently in use patches in the form of plates, tire patches, or what might be termed plasters, and which articles consist of a main body of any cross section and of vulcanized rubber and a bonding or adhesive layer on the underside of the main body. This latter layer serves the purpose of establishing a connection between the main body and the article being repaired to enclose a damaged area like a hole, or effects bridging of the space between two parts to be joined, either by what can be termed an adhesive action, cementing or mere adhesive action, or by a subsequent cold or hot vulcanization.

The statements set forth hereinafter apply particularly to what can be termed cold pasting or cold vulcanization, yet they are not to be taken as excluding hot vulcanization.

In many instances the so-called cold adhesion fulfills its purpose, while in other cases it is considered as unsafe and vulcanization steps are preferred. Thus, for example, a preferred field of application in which vulcanization is involved is the repair of rubber or rubberized containers that are subjected to interior pressure such as vehicular inner tubes, inflatable boats, and the like. With articles of this character it is essential that a completely tight closing of the damaged area or hole be obtained. Accordingly, it is desirous that patches be produced which are simple to manipulate and yet will assure definitely rigid and tight closing of the damaged area.

A mere adhering or cementing type joining layer of combined patches consists mostly of unvulcanized rubber without any, or with only a low, filler content. Cementing has the advantage that it can be easily and rigidly effected, even by unskilled persons. However, such joining of the patch to the article has the disadvantage that upon subsequent heating of the repaired part, the connecting layer becomes soft and slippery again and consequently when shear forces arise the patches can be rubbed off or slide away from the hole or damaged area, or a juncture effected by a patch can be released or severed so that serious accidents can occur.

Consequently, it is preferable to use, in effecting repairs, a connection of the patch to the article which avoids such drawback, preferably by vulcanizing the repair patch in place. The dangerous sliding of patches, initially not yet rigidly connected with the article to be repaired or joined, is overcome by arranging a connecting layer which, in contrast to the mere adhesive layer previously described, has a high deformability or flexibility characteristic (900–1200 grams); that is, the connecting layer consists of a disintegrated rubber mixture of high filler content which is thus very elastic yet possesses low plasticity and can be designated as a dry mixture.

Patches with a dry, short fibered connecting layer can, under certain circumstances, eliminate the aforedescribed disadvantages. However, this can only be done if special care is exercised in applying the patch to the damaged area or hole or to the area to be bridged or joined and in the preparation effected before the patch is applied. Such particular care or pains, according to experience, is not often taken since patches of this type are used not only by experts but very frequently by what can be termed laymen, who are not familiar with repair or joining techniques. Additionally, according to experience, in consumer circles there exists a prejudice that only highly sticky, thick rubber solutions or brushed-on vulcanizing liquids effect a good union between patch and article to be repaired. The result is that a patch particularly directly over the damaged area, after brushing in or on a rubber solution or vulcanizing liquid, is dried slightly prior to the application of the patch to the article. Then the solvent of the rubber solution or of the vulcanizing liquid cannot evaporate and an adhesion that is too moist in solvent, a soaking of the roughened rubber part to be repaired, and consequently a poor joint is obtained. This results in that the complete adhesion and/or thorough vulcanization either only partly or does not at all occur. The drying of even a uniformly thin film of solvent is dependent upon the moisture content in the air and the surrounding or ambient temperature. Due to this fact, drying occurs, dependent on such conditions, between ½ and 10 minutes, which factor is generally not taken into consideration by inexperienced users of patches.

An additional great disadvantage which is more or less attendant with all known patches is their limited capacity for storage. This leads to the fact that any patches which have been stored for a long time cannot effect proper repairs, particularly if the so-called cold pasting or cold vulcanization method is used. The limited storage capacity of known patches is occasioned because, on the one hand, quick adhesion or vulcanization of a patch is desirous, and on the other hand, the qualities of the material which provide for such quick adhering or vulcanization properties impair the storage factor.

The present invention, therefore, has for an object to remove the aforedescribed disadvantages and to utilize the advantages of the adhesive bonding or connecting layer and of a dry bonding layer to the same degree.

In its simplest form of execution, the present invention has for an object to provide a repair or joining member in the shape of a plate, large or small, a plaster, a patch, a band or the like, which includes a main body of any shape, that is, rectangular in cross section, a cross section similar to a truncated pyramid, lentil-shaped cross section, or one bulged upwardly and tapered downwardly to a thin feather edge. The body layer is of vulcanized rubber and at least two bonding or connecting layers of unvulcanized rubber mixtures are juxtaposed onto the body layer or are superimposed on one another on the body layer. One of these bonding layers consists of a dry, short fibered bonding layer of high flexibility or deformability characteristic of the order of 900–1200 grams. Such layer, particularly with the possibility of heat acting on the damaged area, serves as a holding layer. The other bonding layer consists of a plastic mixture of longer fibers and lower deformability or flexibility characteristic of the order of 400–600 grams, having higher adhesive capacities. This other layer provides the advantage of an excellent bond immediately after applying the patch over the damaged area or hole. In other words, the connecting layer of low deformation value is adapted to effect immediate strong adhesion of the patch to the article to be repaired and to maintain this adhesion, at least for the time required for the first connecting layer of high deformation value to effect a more permanent connection of the patch to the article.

A further characteristic of the invention consists in the fact that the patches of the invention can be applied without using any adhesive liquid or vulcanizing liquid on the article being repaired or joined. Such factor, in comparison with known methods of repair, provides not only an enormous simplification in the repairing steps and a lowering of the costs involved but also gives rise to enormous advantages by eliminating the main source of defects in such repairs.

With vulcanizing patches which are applied, for example, on the article to be repaired without utilizing a vulcanizing liquid, the achievement of long stability of the bonding layers in storage presents a particular difficulty. Any sulfur which has migrated from the main body of vulcanized rubber, even in the most minute quantities, can bring about the vulcanization to the bonding layers which contain high contents of accelerators. The addition of high accelerators or ultra accelerators in the bonding layers is necessary, however, in order to carry out on contact with the article to be repaired, for example, the roughened surface of an inner tube, a rapid vulcanization with the small quantity of uncombined sulfur in the vulcanized main body. This rapid vulcanization has to occur at low temperatures, that is, for example, at 60° F. in 30 minutes, utilizing the internal pressure within the tire tube.

A problem thus arises in forming the main body of the patches during vulcanization thereof so that after the main body has been formed by vulcanization there does not occur a migration of sulfur, even in the smallest amount or traces, into the still adhesive bonding layer so as to avoid vulcanizing these parts together during storage. It has been ascertained that the addition to the main body layer of a high content of thiuram sulfides and their derivatives, among which tetraaryl-, and tetraalkyl thiuram disulfide occupy a preferred position, without the use of sulfur, attains a satisfactory vulcanization of the main body. According to present research, and decisive for utilization with sticky, particularly unvulcanized bonding layers, these substances are not to be considered as yielders of sulfur and after vulcanization of the main body there do not result deposits and migrations of sulfur therefrom.

Furthermore, the invention has for an object to provide a patch which, in a preferred form of construction, includes a vulcanized main body thicker at its mid-portion and tapering downwardly and outwardly to a thin marginal rim, on the bottom of which there is an intermediate dry, short fibered layer of high deformability characteristic and then a more adhesive long fibered unvulcanized connecting layer having a diameter greater than that of the main body and, for better rigidity, this vulcanized thin margin of the body layer is embedded in the unvulcanized bonding layer.

It is a further object of the invention to provide a method of producing a repair patch of the compound type, that is, which includes at least three components; a main body layer of vulcanized rubber, a component of bonding layer that has high adhesive characteristics, and another bonding layer component of unvulcanized rubber, so as to ensure that the patch when applied is initially quickly adhered to the damaged area and subsequently vulcanized in place so as to provide a strong connection with the article being repaired.

It is a further object to provide a patch with the characteristics mentioned in the immediately aforegoing paragraph, and a method of producing the same which possesses long stability in storage, is economical to produce, and can be expeditiously utilized even by inexperienced persons in effecting safe repair to damaged articles such as inner tubes and a strong bond between two rubber or rubberized articles to be joined.

Further and more specific objects will be apparent from the description taken in connection with the accompanying drawings diagrammatically illustrating the invention, and not intended to be restrictive of the application of the principle of the invention.

In the drawings:

FIGURE 1 illustrates a known repair patch;

FIGURE 2 is a diagrammatic plan view of one form of patch construction in accordance with the invention;

FIGURE 3 is a cross sectional view taken along lines 3—3 of FIGURE 2, and illustrating the patch as applied to an article to be repaired such as an inner tube;

FIGURE 4 is a plan view of the patch shown in FIGURES 2 and 3 as viewed from below, that is, in the direction of the arrow 4 in FIGURE 3;

FIGURE 5 is a cross sectional view taken along lines 5—5 of FIGURE 6, and illustrating a modified form of patch in which the body layer is bulged and tapers downwardly to a thin rim;

FIGURE 6 is a view of the patch of FIGURE 5 as viewed in plan from the bottom in the direction of the arrow 6;

FIGURE 7 is a fragmentary plan view of a modified, particularly useful, patch construction;

FIGURE 8 is a cross sectional view taken along lines 8—8 of FIGURE 7;

FIGURE 9 is a fragmentary plan view of the patch of FIGURES 7 and 8 taken in the direction of the arrow 9;

Figure 10:
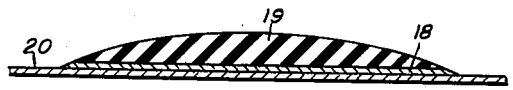
FIGURE 10 is a cross sectional view of a further modification of patch construction incorporating superimposed layers.

In the following by way of examples described patches or joining members the thickness of the adhesive layer or layers is about 0.1 to 0.4 mm. before being pressed and about 0.05 to 0.25 mm. after having been pressed together with the main body layers.

The so-called defo-value, which designates the deformability or flexibility characteristic of the rubber is that weight in grams, which is required to compress a cylindrical test piece of the rubber mixture of 10 mm. height and 10 mm. diameter within the time of 30 seconds from 10 to 4 mm., said cylinder having been bored out from the caoutchouc- or rubber mixture test cylindrical test piece. Then the piece is to be unloaded and it has to be observed the recovery taking place within the following 30 seconds. Thus, two measuring values are obtained, the first one indicating the defo-tenacity and the second one the defo-elasticity. Normally the proof temperature is 80° centigrade. The test cylinders are preheated at this temperature during 20 minutes.

Thus, a rubber mixture having a high deformation or defo-value of the order of 900–1200 grams is comparatively dry and elastic but its plasticity is low and it is said to form short threads or be short fibered. The immediate power of adhesion of such mixture, due to these properties is low. By a contrast, a mixture of low deformation or defo-value of the order of 400–600 grams is relatively wet and plastic, can be stated to form long threads or fibers and is very adhesive. Thus, in the appended claims, the expression defo-value is the above referred to weight in grams required to compress the cylindrical test piece from a height of 10 mm. to a height of 4 mm. in thirty seconds at a temperature of 80° C.

In FIGURE 1 is illustrated a known repair patch or joining member which includes a main body 1 of vulcanized rubber, a thin body layer 2 of unvulcanized rubber that is substantially larger than the main body layer, a removable protective layer 3 of linen, other textile material, paper, metal foil or the like, and a removable covering layer 4 similar in shape and material to the layer 3. In such known patches the bonding layer 2 projects substantially beyond the margin of the main body so that a particularly soft, flexible connecting rim portion 5 is provided which, due to the possibility of participating in the motions of the repaired article, for example, fulling motion of the vehicle inner tube, assures a satisfactory adhesion of the main body 1 onto the article to be repaired or onto two parts to be joined.

In FIGURES 2 to 4 is illustrated a patch constructed in accordance with the invention, and one which finds preferable application to the repair of what can be termed rubber containers that are subjected to interior pressure, such as vehicular inner tubes, rubber or rubberized rafts, or other inflatable objects. In this form of the invention the main body 7, shown as rectangular in plan, consists essentially of vulcanized rubber having bevelled edges as shown at 8. Attached to the under surface of the main body is a connecting layer consisting of two portions 9 and 10. In accordance with the invention the connecting or bonding layer portion 9 consists of a dry, short fibered mixture of high deformability and the bonding layer portion 10 is constituted by a sticky, more adhesive, longer fibered mixture of low deformability. In the utilization of the patch of this invention the connecting layer portion 9 serves as a holding margin or rim and, in the form executed, it has the shape of a rectangular frame within which the more adhesive layer portion 10 is arranged, both layers being joined in juxtaposition to the underside of the main body 7. Thus, the so-called dry layer 9 is the one that effects ultimate vulcanization of the patch to the repaired article whilst the sticky, more adhesive layer 10 effects immediate connection that is effective during the time required for the dry layer to function.

An additional form of patch is illustrated in FIGURES 5 and 6. In this form the main body 11 of vulcanized rubber is bulged at its middle, or is lentil-shaped, or of similar cross sectional configuration. To the bottom of the main body are two bonding layers 12 and 13. The essential distinction, in comparison with the arrangement of FIGURES 2 to 4, consists in the fact that the layer 12 protrudes beyond the marginal rim of the main body and the two bonding layer portions are not arranged in juxtaposition, but in overlapping relation. As shown, the bonding layer portion 12 is shaped as a round thin plate, while the bonding layer portion 13 is annular in shape, and during production is impressed into the bonding layer 12 to impress a part of that layer into the underside of the main body portion so that a flush bottom patch is obtained, the flush bottom being important in order to obtain a smooth, foldless engagement of the patch to the article to be repaired. The layers 12 and 13 correspond in characteristics to the layers 9 and 10.

A further and particularly useful form of patch construction is illustrated in FIGURES 7 to 9. In this form the main body layer 11 is again bulged to be thicker in the middle and tapered downwardly and outwardly to a thin rim portion. A dry bonding layer portion 12 in the shape of a thin plate is coaxially positioned on the bottom of the main body and a more adhesive bonding layer portion 14, also in the form of a thin plate but of less diameter than that of the layer 12 and the main body, is applied to the under surface of the layer 12. During production of the patch, the layer 14 is impressed into the layer 12 to impress a part of that layer into the under surface of the main body and provide a smooth flush bottom patch. Such a patch arrangement of the main body that is bulged or thickened at its middle has a thin margin having mutually spaced finger-like extensions or projections 16 that extend partway into the outer marginal zone of the bonding layer 12 with a so-called holding margin which has a width extending somewhat beneath the main body and which patch also has a highly adhesive layer 14 of large area, has proven particularly useful. As shown at 17, one of the bonding layers can engage over the tapering margin of the finger-like extensions of the main body so that after the body is embedded in the bonding layer it cannot become loose therefrom. In other words, the annular portion of the bonding layer 12 is applied over the top of the rim and finger portions of the body layer 11.

In the patch forms illustrated in FIGURES 2 to 9 the bonding layer portions are arranged either in juxtaposition or in mutually superposed relation in such a manner that a marginal holding portion originates which can stop the escape of pressure medium out of a hole, such as in the inner tube portion 6 shown in FIGURE 3, practically as soon as the patch is applied, that is, at a time interval when the more highly adherent bonding layer portion such as 10, 13 and 14 has not yet been firmly vulcanized to the article to be repaired, such as an inner tube. In all of these forms the under surface of the patch is smooth.

Furthermore, the embodiments according to FIGURES 5 to 9 have the advantage that the bonding layer of higher adhesive capabilities is rendered rigid with the dry, short fibered holding layer so that in the event of stretching of the repaired article a sufficient compensation for tensions originates and the tacky bonding layer portions 10, 13 and 14 cannot become detached from the main body.

It has been demonstrated that the aims of the invention can be advantageously achieved in such manner that the layers are partly superposed to such an extent that only small areas of the dry bonding layer component appear outwardly of the body layer or, as shown in Figure 10, this dry bonding layer component becomes a rigidifying intermediate layer 18 between the main body 19 and the more adhesive bonding layer 20. With this arrangement, both bonding layers can project beyond the periphery of the main body, and the layer 18 can be smaller than, or of the same size as, the layer 20.

The invention further includes special mixture proportions for the different layers of the patch.

As previously mentioned, the storage capacity depends to a high degree on whether one is able to keep the components not wholly used during production of the main body and of sulfur and accelerators away from the bonding layers, that is, to the extent to which the tendency of these mixture components migrate into the bonding layers can be restrained.

According to the invention, the mixture of components making up the main body required for vulcanization is so constituted that it contains just enough sulfur and that in bound form, so that the same is wholly or nearly completely consumed during vulcanization of the main body. The mixture contains 100 parts by weight of unvulcanized rubber and filler, for example, soot, and about 2 to 6 parts by weight of a substance containing sulfur in bound form, for example, tetramethyl thiuram sulfide. The mixture forming the long fibered stickier portion of lower deformability value has a special composition containing an accelerator combination and consists, for example, in addition to 100 parts by weight of smoked sheet rubber, about 40 parts by weight of zinc white, about 40 parts by weight of active zinc oxide, about 5 parts by weight of colophony, 20 to 40 parts by weight of ethyl phenyl dithio carbamate of zinc or the accelerator sold in the trade under the protected name "Vulkacit P extra N," 10 to 20 parts by weight of a condensation product of the homologue acrolein with aromatic bases, or the accelerator sold in the trade under the protected name "Vulkacit 576" or "Vulkacit HX," and 5 to 8 parts by weight of mercaptobenzol thiazol or the accelerator sold in the trade under the protected name "Vulkacit Mercapto" or a remedy against aging.

The dry, short fiber forming mixture can also contain accelerators. It will be necessary to take care that only accelerators in powdered form are used in order that this bonding layer portion can be prevented in any case from becoming plastic. This last bonding layer component can also be prepared for efficacious and quick vulcanization by dusting it from the top with sulfur powder after the repair or joining member has been placed over the damaged area.

It is known that the proper proportioning of mixtures to the main body necessary for vulcanization is especially difficult, since on the one hand perfect vulcanization of the main body in the shortest time during production must be assured, yet on the other hand, the migration of these mixtures into the bonding layers prior to use leads to the dreaded and harmful prevulcanization.

According to the invention the danger of free sulfur migrating from or in the main body layer is completely eliminated. Therefore, a practically unlimited storage capacity is assured. This is achieved by an admixture of thiuram sulfides and their derivatives with the main body mixture. Among such components tetraaryl thiuram sulfide, tetraalkaryl thiuram sulfide, tetraarylalkyl thiuram sulfide and the tetraalkyl thiuram sulfides occupy a preferred position. However, according to the invention, there is proposed a still further solution of the problem of storability if for any reason the selection of a special main body mixture is eliminated.

Figure 11:
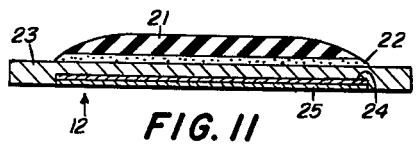
FIGURE 11 is a cross sectional view of still an additional modified patch construction incorporating a so-called buffer layer.
Figure 12:
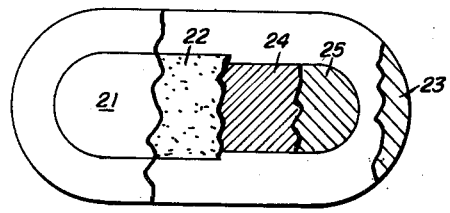
FIGURE 12 is a view partly in plan and partly broken away of the patch of FIGURE 11.

FIGURES 11 and 12 show a form of patch construction in which the main body 21 is separated from the bonding layer by a so-called buffer layer 22. According to the invention, this layer 22 is practically free from sulfur or vulcanization accelerators and prevents the migration of free sulfur possibly still contained in the main body or of vulcanization accelerator parts into the bonding layer from the short fibered, dry bonding layer 23 of a mixture of high deformability, while embedded in this layer 23 is a second highly sticky, long fibered vulcanization accelerator-free layer 24 of a mixture of low deformability which adjoins on its under side a layer 25 which is flush with layer 23 and which layer 25 is an additional sticky layer of long fibers containing a high content of vulcanization accelerators.

Figure 13:
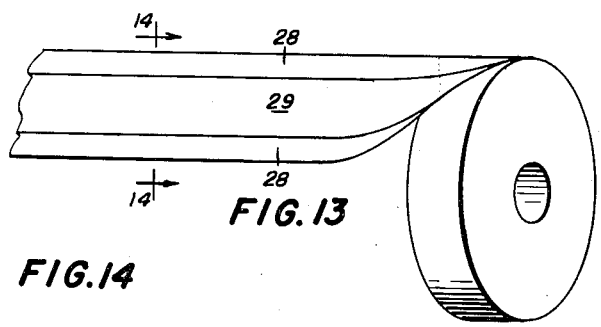
FIGURE 13 illustrates the invention as applied to a repair or joining member constructed in taped form.
Figure 14:
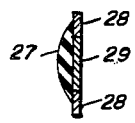
FIGURE 14 is a cross sectional view taken on lines 14—14 through the tape of FIGURE 13.

In FIGURES 13 and 14 is disclosed an additional possibility of application or shaping of the invention. FIGURE 13 illustrates substantially in bottom plan view a wound band or tape 26 which can be used for conductor cable wrapping or otherwise wrapping about joints or damaged spots. This tape includes a bulged main body portion 27 of band form, see FIGURE 14, a dry bonding or holding layer portion 28 and a stickier, more adhesive bonding layer 29.

It is now known that the so-called artificial or butyl rubber contains substantially more sulfur than natural rubber. Since vulcanization speed depends, in the first place, on the available sulfur to be introduced into the bonding layers of the patch, the small sulfur content present in natural rubber articles would mean a certain retardation in the time which is required to keep what can be termed "through vulcanization," resulting in a firm bond. The retardation factor is further increased with increasing age of the article to be repaired. This is due to the fact that sulfur has a tendency to diffuse from the rubber in the course of time. Additionally, as the article ages sulfur which has accumulated near the surface is scratched off during roughening of the damaged area prior to repair by vulcanization.

According to the invention, in such instances or if an especially short vulcanizing time is desired, an additional medium that yields sulfur is provided. This medium during transportation or storage of patches is to be kept away from the bonding layers but should be so arranged that it can be brought into contact therewith when the patch is to be applied to a damaged area.

Figure 15:
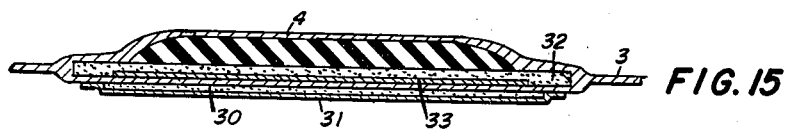
FIGURE 15 is a cross sectional view through a still further form of patch and one suitable for particularly quick vulcanization or for application to rubber articles of low sulfur content.

One possible mode of carrying out this concept is shown in FIGURE 15. In that figure, the patch includes on the protective layer 3 serving to protect the bonding layer against injury, dirt, oxygen absorption from the air and the like, a thin layer or film of sulfur, powdered sulfur, or a mas consisting predominantly of sulfur or containing the same. This thin layer 30 is, in turn, covered by a thin protective layer 31 of paper, synthetic material or the like. The protective layer 3 prevents the migration of sulfur into the bonding layers 32, 33, the inner one of which is a sticky adhesive as in the previous forms. This layer 3 can be of metal foil. Prior to application to the damaged area the layer 31 is drawn off and then the protective layer 3 carrying the sulfur layer 30 is removed from the bonding layers, reversed and placed thereagainst. Then the protective layer 3 is withdrawn and the strata of sulfur adheres to the bonding portions.

Figure 16:
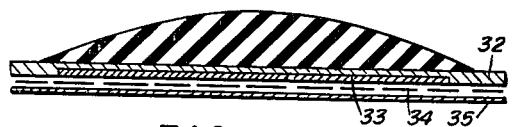
FIGURE 16 is a cross sectional view through a patch of predominantly bulge shape for utilization in the same manner as the patch of FIGURE 15.

Another form of this phase of the invention is shown in FIGURE 16. In this example, the bonding layer portions 32, 33 are covered with a very thin film of a very dense, yet fragile, substance, for example, natural or synthetic resin, and on the same is applied a layer 35 consisting of sulfur or containing a sufficient quantity of sulfur to effect the desired result. The intermediate layer of natural or synthetic resin or other suitable synthetic material, is fractured during pressing on or winding of a patch onto a damaged area so as to afford the possibility of the sulfur penetrating into the bond layer portions and into the roughened up damaged area so as to complete quick vulcanizing together of patch and article to be repaired.

The invention characteristics set forth in FIGURES 15 and 16 are, of course, applicable to all of the other illustrated forms of patches, as well as to patches of other shapes and configuration constructed within the teachings of the invention.

It should also be pointed out that the bonding layer components of the invention are very thin compared to the thickness of the main body and are shown thicker in the cross sectional views of the drawings for purposes of better illustration. For example, prior to being assembled with the main body structure, the bonding layer portions have a thickness of 0.5 mm. which, under the pressures generated during manufacture of the patch, is reduced to a thin film-type layer of a thickness of 0.2 to 0.25 mm.

In the method of manufacture according to the invention the main body forming mass is initially in the form of a plurality of thin plates and upon the same the dry, short fibered bonding or adhesive layer forming portion or intermediate layer is molded in a press or in a so-called winding device under the influence of heat and pressure until the body layer is completely vulcanized and the bond of the two or three layers is established. In addition, for the so-called spreading machine on the protective or patch covering layer or foil 3, the sticky, long fibered bonding or adhesive layer, or layers, is spread and then adhered to the first-named repair body and joining layers. Additionally, in production, all of the component parts can be joined to one another in a single heating and pressing step.

During vulcanization by the pressure of the press on the main body, thicker at the middle, a large part of the sticky bonding layer is pressed outwardly. For this reason, at the middle of the patch an additional layer of the same mixture, or of a mixture still more adhesive, is embedded.

With bonding layers wholly or partly superposed, the dry bonding layer is slightly vulcanized so that the more adhesive bonding layer is rigidified by the dry bonding layer or portion, and when stretching occurs tensional forces are compensated for, thus preventing detachment from the main body when it is applied to an article to be repaired.

The slight vulcanization of the dry bonding layer is achieved by admixture therewith of thiuram sulfide in a concentration about 0.2 to 1.5% of the rubber.

It is expedient to so prepare the more adhesive bonding layer portion that it sticks yet does not draw too long fibers. This is obtained by a rigidifying means, for example, a mixed polymer of butadiene and styrol which somewhat reinforces the layer and in so doing renders it still more adhesive.

From the drawings it appears that the possibility of variation as regards shape and arrangement of the bonding layer portions is unlimited, it being expedient for the purpose of fully eliminating confounding or confusing the entirely different layers with one another during production to give the same a different color. For example, the dry, short fibered mixture can be red and the sticky, longer fibered mixture can be white.

The drawing off of the protective layer that shields the sticky bonding layer and prevents it from absorbing moisture from the air, such as a layer of the type of layer 3 in FIGURE 1, is difficult because of the highly adhesive effect of the bonding layer. Neither textile shirting nor metal foil have proven particularly suitable, and hygroscopic covering layers cannot be used because they permit the passage of moisture into the bonding layer and because they shrink and expose spots of the bonding layer. A useful and workable covering layer is metal foil combined with cellophane, with the cellophane being placed against the bonding layer portions. In other words, a cellophane lined metal foil is applied over the bonding layer side of a patch.

It does not have to be particularly emphasized that the repair patches or joining members of the invention are not only suitable for use as mere adherent or cold vulcanizing members, but that they are also suitable for joining to articles to be repaired by means of hot vulcanization. As an example, it is to be pointed out that such type bonding method is attainable without using an otherwise usual heating solution at a temperature of 145° C. with the bonding being in from 2 to 3 minutes.

The invention also embraces repair patches constructed in accordance with the invention, and within which one or more reinforcing inserts, for example, linen, are embedded in the main body of vulcanized rubber.

The repair patches or joining members of the invention are suitable for all types of repairs, for example, bicycle or motor vehicle inner tubes or tires, rubber covers or mats, conveyor belts, belting, rubber footwear, rubber clothing, rubber or rubberized medical containers, inflatable boats and rafts, and camping and field equipment where made wholly or in part of rubber or rubberized material. The patches are, of course, not to be restricted to these uses, which are mentioned only as examples, and the patches are furthermore not to be restricted to the construction and forms illustrated, which are shown as rectangular, round, or band form, regardless of size. It is therefore pointed out that the shape of the patch can be whatever is desired for a particular use.

What is claimed is:

1. A multi-layered repair or joining-member for rubber or rubberized articles comprising a main body layer having one side adapted to be adjacent the article to be repaired, secured to said one side a composite connecting means comprising at least two thin connecting portions, each substantially of unvulcanized rubber composition, one of said portions consisting of a dry adhesive portion having a high defo-value characteristic of the order of 900–1200 grams and the other a sticky adhesive portion having a low defo-value characteristic of the order of 400–600 grams.

2. A multi-layered repair member as claimed in claim 1 in which the two connecting portions form a single layer with the said one portion surrounding the other.

3. A multi-layered repair member as claimed in claim 1 in which the two connecting portions are superimposed upon one another with said one portion surrounding the other.

4. A multi-layered repair member as claimed in claim 1 in which the connecting means is of greater surface extent than the main body so that it projects beyond the periphery of the main body.

5. A multi-layered repair member as claimed in claim 1 in which the said two connecting portions are separate layers, one partly covering the other and both being pressed together and to the main body so that the exposed surfaces of both layers are flush with one another.

6. A multi-layered repair member as claimed in claim 1 in which the said two connecting portions are separate layers with said one portion being arranged between the main body and said other portion and having a surface extent not exceeding that of said other portion.

7. A multi-layered repair member as claimed in claim 1 in which the repair member is in the form of an endless tape and the thickness of the respective portions of the connecting means being less than 0.5 mm.

8. A multi-layered repair member as claimed in claim 1 in which the said connecting portions are separate layers, said one portion being larger than the other and larger than the main body, said main body being thicker in the middle and tapering downwardly and outwardly to a thin marginal rim and said rim being embedded in said one portion.

9. A multi-layered repair member as claimed in claim 1 in which said portions are of contrasting colors.

10. A multi-layered repair member as claimed in claim 1 in which the main body has admixed therewith a thiuramsulphide compound selected from the group consisting of tetraaryl thiuramsulphide, tetraalkaryl-thiuramsulphide, tetraaralkylthiuramsulphide, and tetra-alkyl thiuramsulphide.

11. A multi-layered repair member as claimed in claim 1 in which the composition of the main body comprises 100 parts by weight rubber, conventional filler material and about 2–6 parts by weight of tetramethyl thiuramsulphide.

12. A multi-layered repair member as claimed in claim 1 in which the dry adhesive portion consists of a mixture of substantially unvulcanized rubber, filler, and a small content of powdered accelerator, the said sticky adhesive portion having a high percentage of an accelerator combination and consisting of a mixture of 100 parts by weight smoked sheet rubber particles, 40 parts by weight zinc white, 40 parts by weight active zinc oxide, 5 parts by weight colophony about 20 to 40 parts by weight of zinc ethylphenyldithio-carbamin acid, 10–20 parts by weight of the condensation product of homologue acrolein with aromatic bases and 5–8 parts by weight of mercaptabenzothiazol.

13. A multi-layered repair member as claimed in claim 1 in which the dry adhesive portion is slightly vulcanized by admixing with the rubber 0.2–1.5% of a thiuramsulfide.

14. A multi-layered repair member as claimed in claim 1 in which the dry adhesive portion is a layer, and between said layer and the main body is interposed a buffer layer consisting of a thin film of unvulcanized rubber free from sulphur.

15. A multi-layered repair member as claimed in claim 1 in which the dry adhesive portion is a layer connected to the main body, said sticky adhesive portion comprising a vulcanization accelerator free layer connected thereto, and on said last mentioned layer a thin film of unvulcanized rubber having a high vulcanization accelerator content and both said vulcanization accelerator free layer and said film being smaller than said dry adhesive layer.

16. A multi-layered repair member as claimed in claim 1 in which the sticky adhesive portion has admixed therewith a strengthening agent consisting of a mixed polymer of butadiene and styrol.

17. A multi-layer repair member as claimed in claim 1 in which the dry adhesive portion is a layer underlying the main body, said sticky adhesive portion comprising a layer connected to said dry layer, a protecting layer covering both layers, a thin film high in sulphur content, and a protecting layer covering said film.

18. A multi-layer repair member as claimed in claim 17 in which said film is so adhered to the first protecting layer that upon removal of the second protecting layer the film adheres to the first protecting layer.

19. A multi-layer repair member as claimed in claim 1 in which the dry adhesive portion is a layer underlying the main body, said sticky adhesive portion comprising a layer connected to said dry layer, a frangible layer of resin overlying both said layers and a layer high in sulphur content overlying said frangible layer whereby in applying the member to an article the frangible layer is broken thereby facilitating passage of sulphur into the adhesive layers.

20. A method of producing a multilayer repair member comprising assembling a main body-forming portion of a vulcanizable rubber mixture and at least one portion of an adhesive layer-forming portion in a press, applying heat and pressure thereto to vulcanize the main body forming portion and convert said adhesive layer-forming portion into a dry vulcanizable layer bonded to the main body forming portion, separately forming a sticky adhesive layer on a removable protecting layer larger than all said layers and subsequently uniting the bonded main body forming portion and dry adhesive layer forming portion to the sticky adhesive layer.

21. A method of producing a multilayer repair member comprising assembling in a press and in superimposition a layer of patch covering material, a main body-forming portion of a vulcanizable rubber mixture, a dry adhesive layer-forming portion of a rubber mixture that will form a dry and at least substantially unvulcanized adhesive layer when the main body forming portion is vulcanized, a sticky adhesive layer-forming portion of a rubber mixture that will form a sticky unvulcanized adhesive layer when the main body forming portion is vulcanized and another layer of patch covering material and then subjecting the superposed layers and portions to heat and pressure until the main body forming portion is vulcanized, and the layers are joined in covering relation to the now shaped patch.

References Cited in the file of this patent

UNITED STATES PATENTS

| | | |
|---|---|---|
| 1,348,466 | Wood | Aug. 3, 1920 |
| 1,480,976 | Wight | Jan. 15, 1924 |
| 1,651,801 | Benson | Dec. 6, 1927 |
| 2,157,183 | Mullen | May 9, 1939 |
| 2,486,669 | Nassimbene | Nov. 1, 1949 |
| 2,582,770 | Cornell | Jan. 15, 1952 |
| 2,638,955 | Gruber | May 19, 1953 |
| 2,803,283 | Gruber | Aug. 20, 1957 |
| 2,833,327 | Boyce | May 6, 1958 |
| 2,855,014 | Gruber | Oct. 7, 1958 |